(12) United States Patent
Matz

(10) Patent No.: US 8,445,808 B2
(45) Date of Patent: May 21, 2013

(54) METHOD FOR ARC WELDING WITH CONSUMABLE ELECTRODE

(75) Inventor: Christoph Matz, Unterschleissheim (DE)

(73) Assignee: Linde AG, Munich ( * ) Notice: Subject to any disclaimer, the term of this patent is extended or adjusted under 35 U.S.C. 154(b) by 642 days.

(21) Appl. No.: 12/609,059

(22) Filed: Oct. 30, 2009

(65) Prior Publication Data

US 2010/0108646 A1   May 6, 2010

(30) Foreign Application Priority Data

Oct. 31, 2008  (DE) .......................... 10 2008 054 172

(51) Int. Cl.
*B23K 9/00*    (2006.01)

(52) U.S. Cl.
USPC ........................................ 219/74; 219/137 R

(58) Field of Classification Search
USPC ............................................... 219/74, 137 R
See application file for complete search history.

(56) References Cited

U.S. PATENT DOCUMENTS

| 6,096,994 | A  | * | 8/2000  | Handa et al. ................ 219/130.5 |
| 6,649,870 | B1 | * | 11/2003 | Barton et al. ............... 219/137 R |
| 2005/0279819 | A1 | * | 12/2005 | Stava .............................. 235/375 |
| 2006/0151440 | A1 | * | 7/2006  | Helgee et al. ................... 219/74 |
| 2007/0051703 | A1 | * | 3/2007  | Neff et al. ........................ 219/74 |

* cited by examiner

*Primary Examiner* — Julia Slutsker
(74) *Attorney, Agent, or Firm* — Rankin, Hill & Clark LLP

(57) ABSTRACT

Methods for arc welding unalloyed or low-alloy steels with consumable electrode under protective gas are suggested, in which the protective gas is a mixture comprising at least helium and an active gas as well as a further inert gas. In the general case, the proportion of the active gas in the total volume of the protective gas is to be in the range from more than 0.5% to approximately 1.5% and the proportion of helium in the total volume of the protective gas is to be more than 30%. In case an electrode having a lowered or medium Si content of approximately 0.2% to approximately 0.4% is used, the proportion of the active gas in the total volume of the protective gas is to be approximately 1% to approximately 5%. If an electrode with a low Si content of approximately 0.05% to approximately 0.1% is used, the proportion of the active gas in the total volume of the protective gas is to be approximately 3% to approximately 10%.

12 Claims, 12 Drawing Sheets

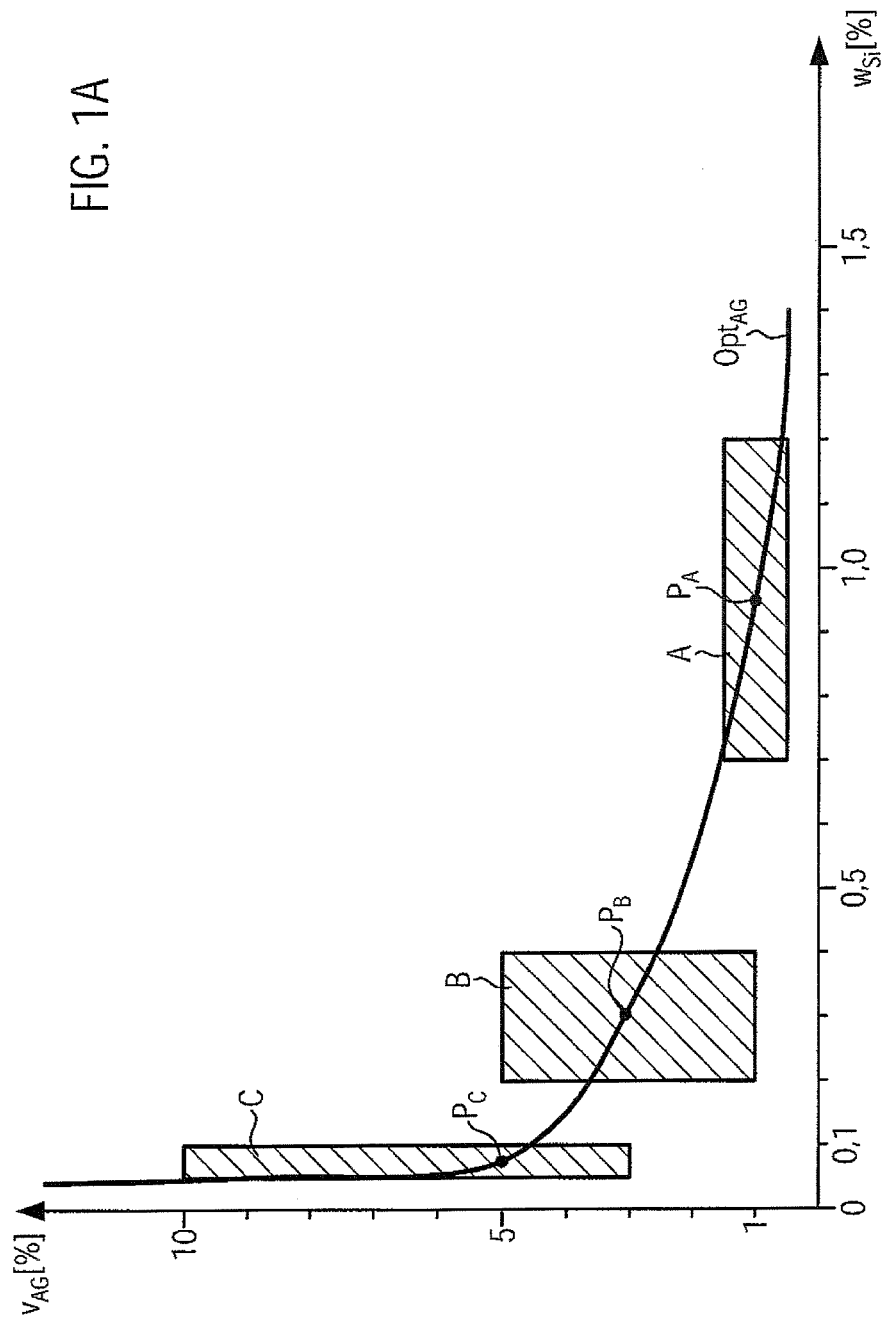

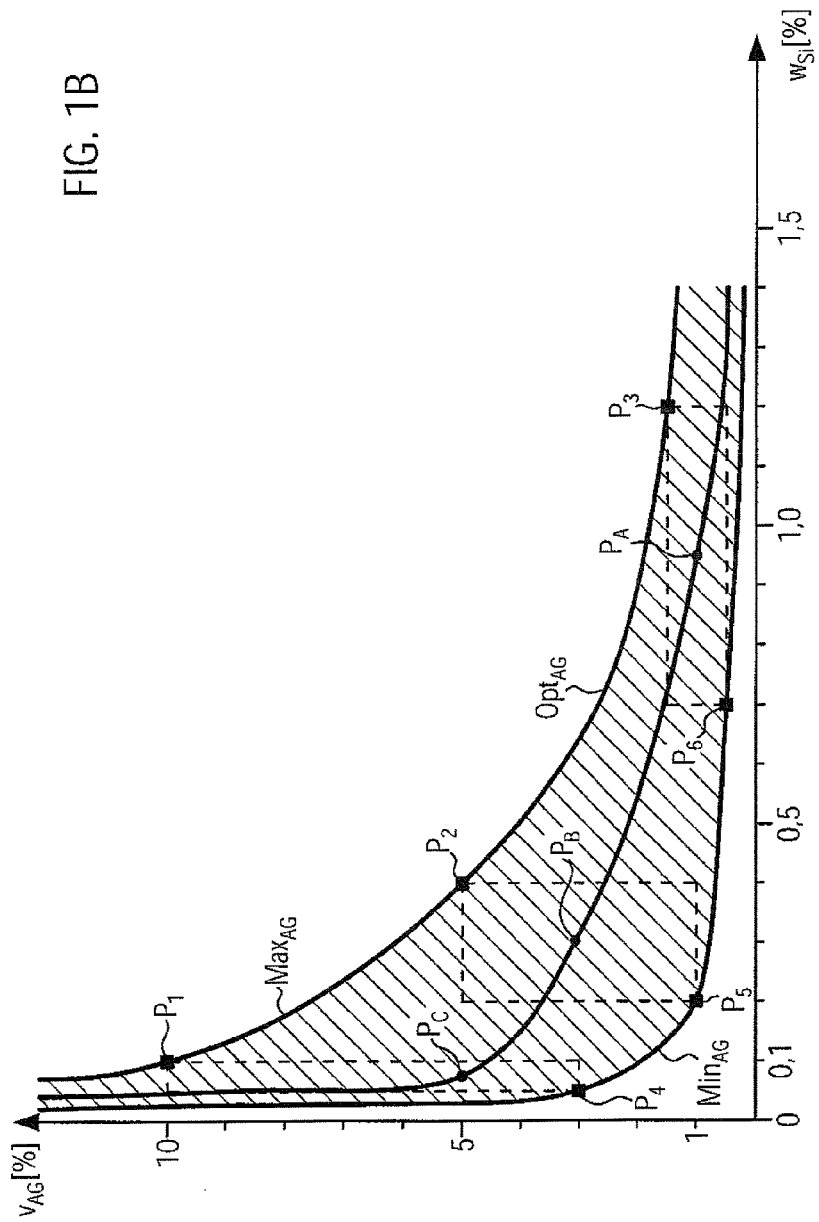

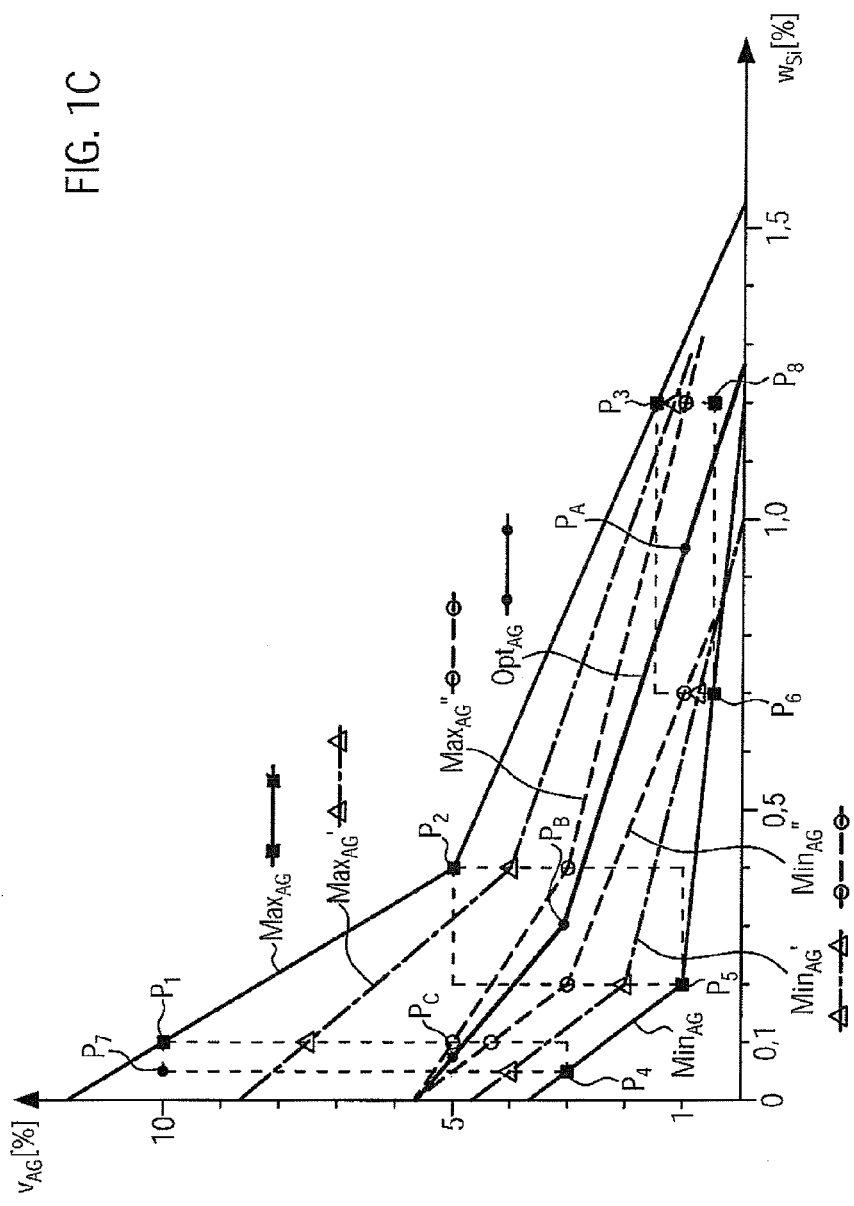

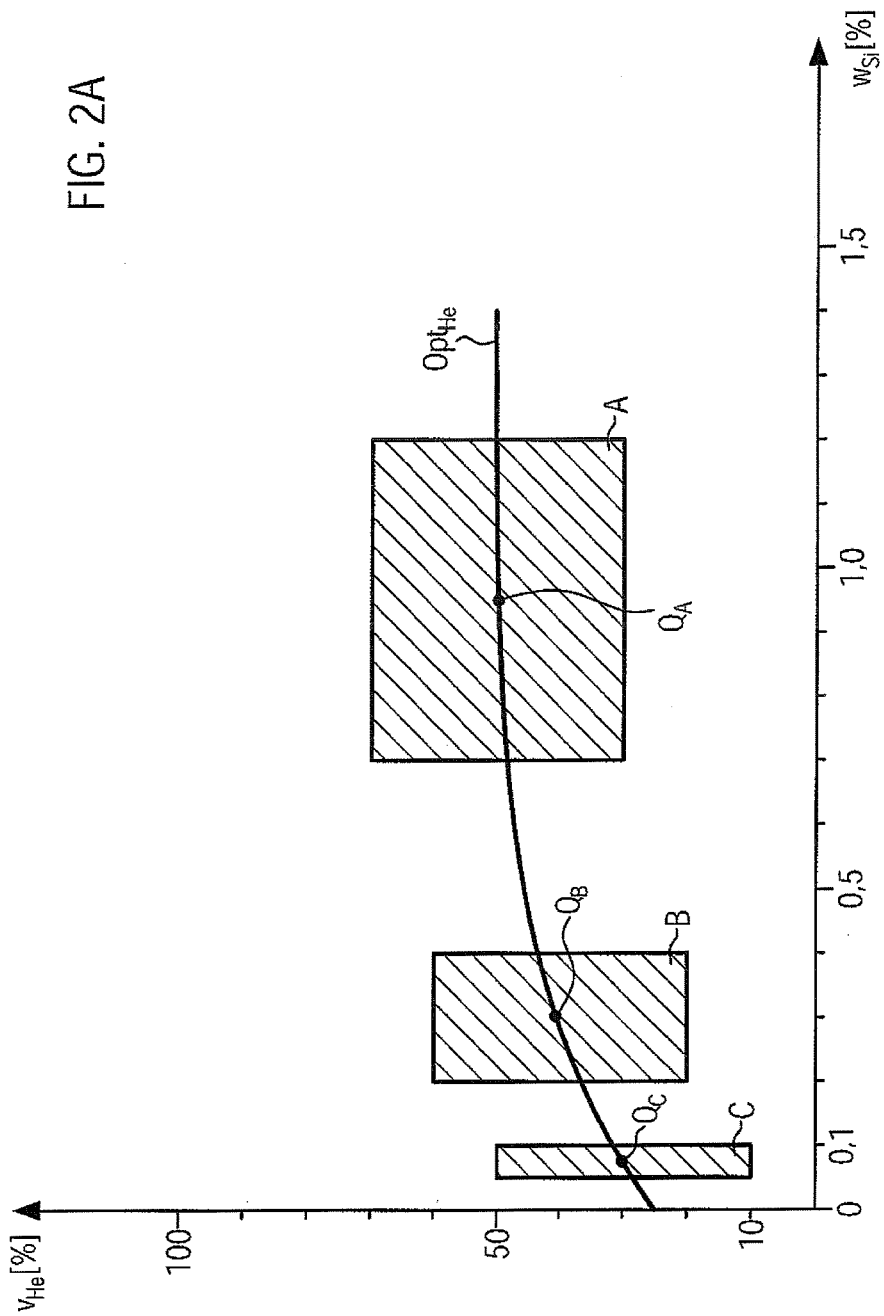

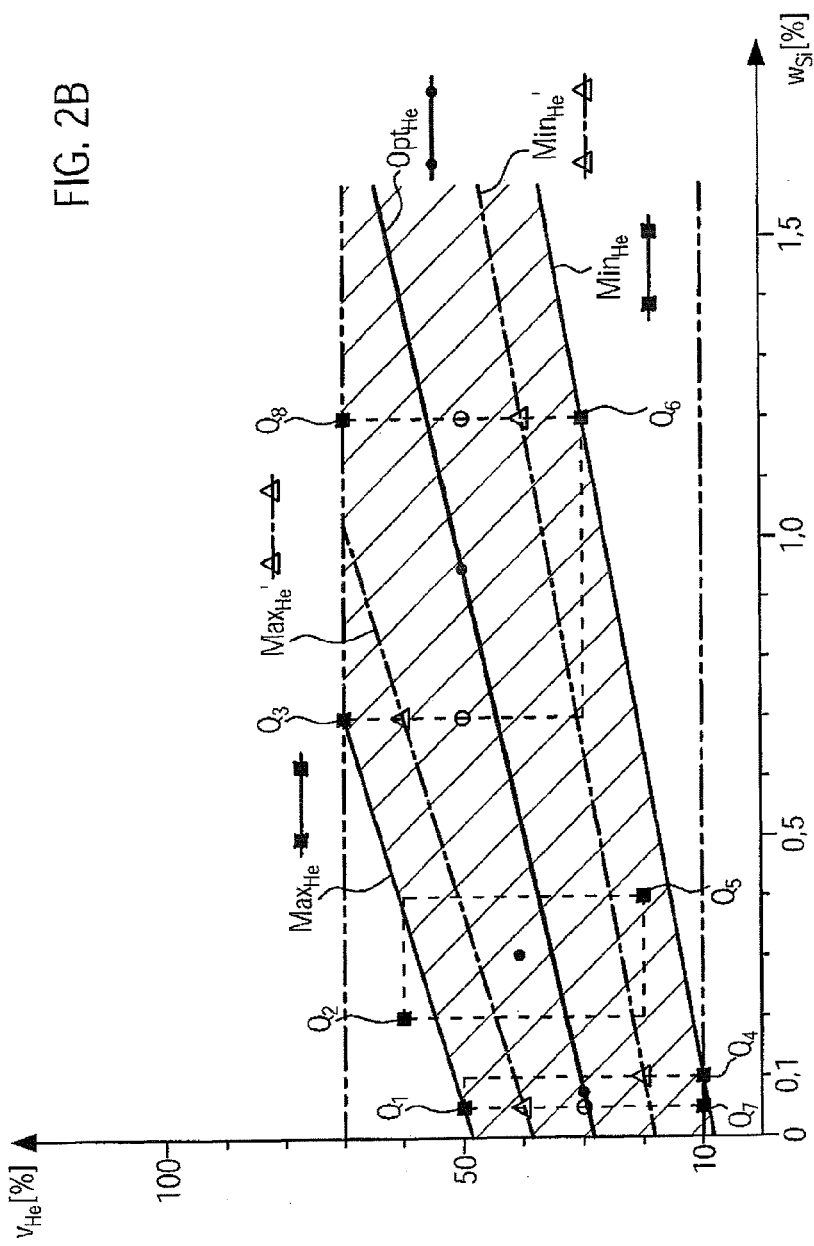

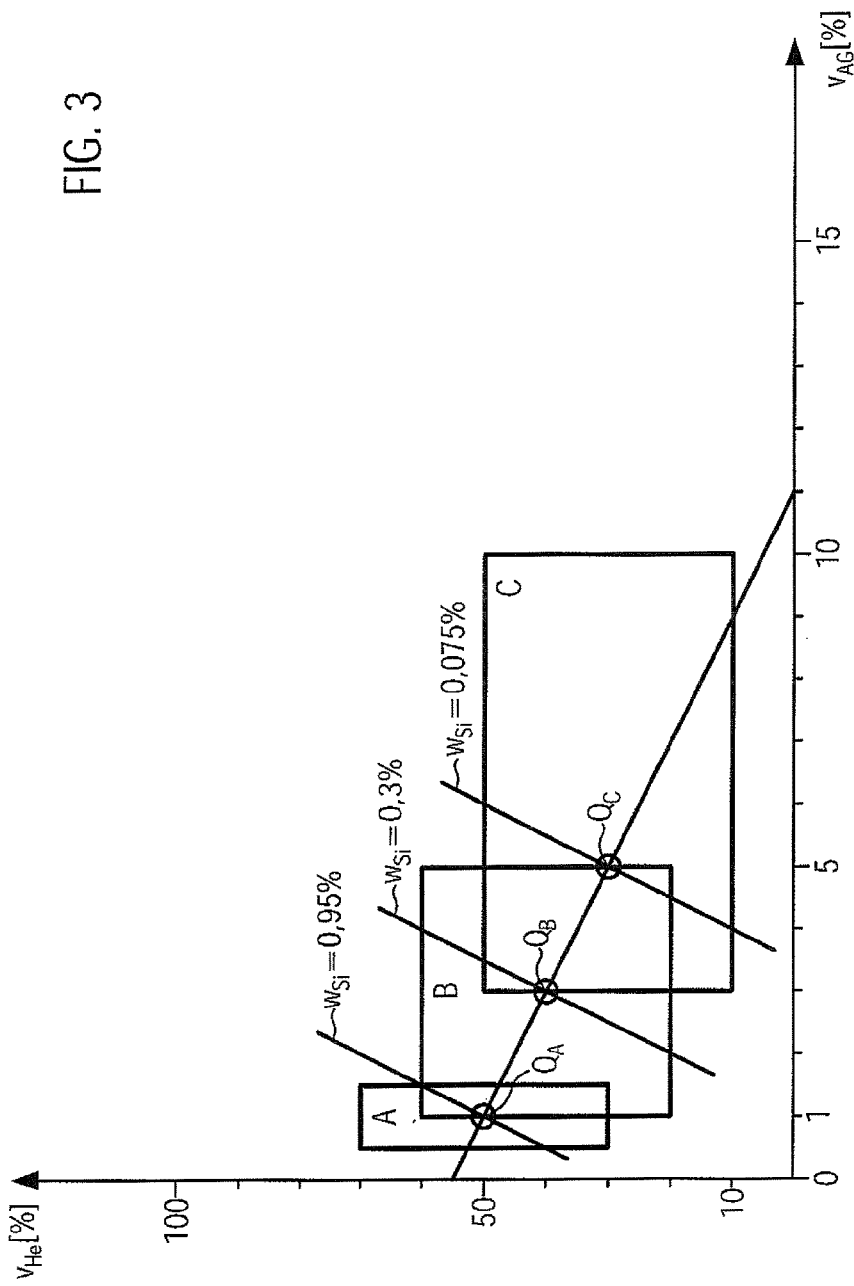

METHOD FOR ARC WELDING WITH CONSUMABLE ELECTRODE

The present invention relates to methods for arc welding unalloyed and low-alloy steels with consumable electrode.

PRIOR ART

It is known to use welding wires (EN 440) G3Si1 or G4Si1 for welding unalloyed steel up to a tensile strength of approximately 600 MPa. As a standard, these wires contain approximately 0.7-1.2% Si for deoxidation and in order to give the weld pool a low viscosity.

Consequently, these standard welding filler materials contain about ten times the amount of silicon compared to the base materials to be welded. Due to the mixing ratio of the weld seam material of approximately 30% base material plus 70% filler material in MAG welding, the welding wire introduces silicon into the weld seam material in an amount which is approximately 20 to 25 times the amount compared to the contribution of the base material.

In general, welding is carried out under a protective gas (EN439) M21 with 18% $CO_2$ in argon, resulting in a strong formation of silicate on the surface of the seam. These silicates hinder subsequent processes such as the KTL coating or priming as the coatings do not adhere thereto. This is why a process step has to be inserted to remove the silicates, in general sandblasting or grinding.

So-called LSi wires with a lowered (~0.2-0.4% Si) or particularly low silicon content (0.05-0.1% Si) are also known. These are currently used exclusively where the welding process is followed by galvanizing or enameling, as otherwise the weld seam with its higher silicon content would shine through because a larger amount of zinc or enamel precipitated on it (Sandelin curve). The welding process is furthermore carried out under said protective gas in order to counteract the tough flowing of the weld pool and the high risk of pores, silicates still forming on the surface of the seam.

The above mentioned technology is described e.g. in: "Pomaska, Schutzgas-schweißen, kein Buch mit 7 Siegeln, Infoschriften des Gemeinschaftsausschusses Verzinken e.V.".

The removal of the silicates requires a laborious and expensive intermediate step.

The present invention is based on the object to avoid the disadvantages mentioned in the prior art. It is a special aim to save the expensive intermediate step for the removal of the silicates in order to improve the operating efficiency.

In order to reduce the adherence of slag (silicates and oxides of other components of the base material and of additives of the welding electrode such as Ni, Mo, Cr, Ti, Mn, etc) during welding unalloyed and other alloyed steels according to DIN EN 10020 (in former times referred to as "low-alloyed steels"), EP 1 714 728 A2 suggests the use of active protective gases with a volume fraction of 0.01-0.5% $CO_2$ or $O_2$, with values of 0.01-0.4%, in particular 0.02-0.1%, especially 0.1-0.5% being preferred, the latter in a mixture of argon with at least 15% helium.

Regardless the slag formation, U.S. Pat. No. 4,871,898 generally suggests to use mixtures of 2 to 12% $CO_2$ and 20 to 45% helium for steels, the lower limit of the $CO_2$ proportion for low-alloyed steels with 8% being indicated with a substantially higher value.

In connection with the above reference, EP 0 494 521 A1 mentions a mixture of 1% $CO_2$ and 30% helium for high-alloy steels (stainless steel) with the trade name HELISTAR SS.

For high-alloy steels (superalloys), EP 0 494 521 A1 initially starts from a known mixture of 2,5% $CO_2$ and more than 85% helium; although this only produces some few splashes (presumably because of the high helium proportion), it results in heavy oxidation on the welded metal surface in the case of nickel-based alloys. Besides, the reference also discusses a mixture of 1% $CO_2$ and 30% helium for high-alloy steels (stainless steel) with the trade name HELISTAR SS. On the basis of experiments conducted with 1.25% $CO_2$+45% He (Trial 1), 0.75% $CO_2$+27% He (Trial 2), 0.5% $CO_2$+18% He (Trial 3) as well as 0.25% $CO_2$+9% He (Trial 4), the reference realizes a reduction of oxidation with falling $CO_2$ proportions and finally arrives at an optimum mixture of 0.1-0.9% $CO_2$+ 5-13% He for high-alloy steels, in particular thin metal sheets. The rest of the protective gas mixture consists of argon and impurities in each case.

BRIEF DESCRIPTION OF THE INVENTION

It is the object of this invention to provide a welding method for low-alloyed steels, an automatic welding machine, a protective gas mixing device and a welding electrode, each allowing to minimize the deposit of slag, in particular of silicates, on the surface of the seam, along with a good welding result.

The problem is solved by the features of the independent claims. Advantageous further developments are the subject-matters of the subclaims.

The present invention relates to the welding of unalloyed and low-alloy steel. "Low-alloy steel" is a steel whose entire alloy components constitute 6 weight % of the steel at most and preferably do not account for more than 5 weight % of the steel.

According to a first aspect of the invention, a method for arc welding unalloyed or low-alloy steels with consumable electrode under protective gas is suggested, in which the protective gas is a mixture comprising at least helium and an active gas as well as a further inert gas, the proportion of the active gas in the total volume of the protective gas being more than 0.5% to approximately 1,5% and the proportion of helium in the total volume of the protective gas being more than 30%.

Such a method serves for selecting the composition of the protective gas such that the formation of silicate on the seam is minimized when a normal electrode having an Si content of 0.7 to 1,2% is used; nevertheless, a heat transmission and heat input sufficient to obtain a reliable weld can be achieved and the disposition to splashes can be reduced.

A second aspect of the invention suggests a method for arc welding using a consumable electrode under protective gas, in which a welding wire is used that has a reduced Si content of in particular approximately 0.2% to approximately 0.4% and the protective gas is a mixture comprising at least helium and an active gas as well as a further inert gas, the proportion of the active gas in the total volume of the protective gas being approximately 1% to approximately 5%.

Such a method takes into account the Si content of the welding wire in such a way that—with a lower introduction of silicon into the weld seam as is the case by using a normal electrode (with higher Si content)—due to a higher proportion of the active gas in the protective gas a better heat transmission and heat input can be achieved and the disposition to splashes can be reduced with the formation of silicate continuing to be small.

A third aspect of the invention suggests a method for arc welding using a consumable electrode under protective gas, in which a welding wire is employed that has a low Si content of in particular approximately 0.05% to approximately 0.1% and the protective gas is a mixture comprising at least helium and an active gas as well as a further inert gas, the proportion of the active gas in the total volume of the protective gas ranging from approximately 3% to approximately 10%.

With such a method, the Si content of the welding wire is taken into account in such a way that—when the introduction of silicon into the weld seam is lower than when a normal electrode or an electrode with medium Si content is used—due to a higher proportion of the active gas in the protective gas an even better heat transmission and heat input can be achieved and the disposition to splashes can be reduced with the formation of silicate still being small.

A fourth aspect of the invention suggest a method for arc welding having a consumable electrode under protective gas, in which the protective gas is a mixture comprising at least helium and an active gas as well as a further inert gas, the proportion of the active gas (and of helium) in the protective gas being determined depending on the Si content of the welding wire.

With such a method, the Si content of the welding wire is considered such that the proportion of the active gas can be adapted to the extent of the introduction of silicon into the weld seam; therefore, the silicate formation on the weld seam can be minimized or eliminated and yet an optimum, i.e. largest possible heat transmission and heat input can be achieved with the disposition to splashes being reduced.

It is preferred that the upper and lower limits of the proportion of the active gas and/or of the helium proportion are determined by interpolation of boundary points of experimentally established ranges, or the proportion of the active gas and/or the helium proportion are selected by interpolation or from experimentally established optimum points.

Selection areas can be limited in the upward direction by the respectively largest data value of the upper interpolation line and in the downward direction by the respectively smallest data value of the lower interpolation line. For the purposes of a quicker convergence it can be useful to shift the data points of the interpolation lines towards the optimum points so as to narrow the selection areas.

The interpolation lines mentioned in this aspect can be determined e.g. as a section sequence, as a natural, continuous, monotone and non-negative spline, as a continuous, monotone and non-negative, in particular quadratic Bezier curve or the like.

The aforementioned methods can provide testing steps in which the proportion of the active gas and/or the helium proportion are adjusted to a value selected according to the regulation indicated in each case and, after the test weld and inspection of the weld seam with regard to silicate deposit and/or other quality characteristics, are iteratively varied within the limits indicated in each case until acceptable results are achieved.

It is preferred that unalloyed steels or low-alloy steels are welded with the methods according to the second to fourth aspects of the present invention.

According to a further aspect of the present invention, a protective gas production apparatus is suggested, comprising: respective holding containers at least for an active gas, helium and a further inert gas in gaseous, liquid or solid aggregate state; a metering device for metering the gases supplied from the holding containers; and a control means for driving the metering device to automatically regulate the volume fractions of the respective gases according to specified values, the control means comprising a receiving device adapted to receive a signal corresponding to a silicon proportion of a welding wire, and a processing means adapted to determine target values for the volume fractions of the respective gases depending on the received signal, the processing means being preferably adapted to determine the target value for the proportion of the active gas and/or the helium proportion in accordance with a method of the aspect described above.

With such a protective gas production apparatus it is possible to automatically produce a protective gas depending on the silicon portion of a welding wire; this protective gas is optimized with respect to the silicate in the best possible way with respect to heat input and heat transfer.

In case the control means comprises a silicon input means for entering the silicon proportion of the welding wire, the user can provide for the optimum adjustment of the protective gas by simply entering the silicon proportion.

If the control means comprises a memory device for storing silicon proportions of different types of the welding wire and a selection means for selecting one type from several types of the welding wire, the user can further provide for the optimum adjustment of the protective gas by simply selecting the type of the welding wire.

The result of the weld can be optimized through setting means for the manual readjustment of the target values for the proportion of the active gas and/or the helium proportion.

It is preferred for the protective gas production apparatus to comprise a priority means for deactivating the control means or the calculation logic for calculating the target values depending on the silicon portion. This allows to adjust a protective gas mixture by a manual presetting of the set-point values or by manually operating the metering device even if an unknown welding wire type or a welding wire with unknown silicon proportion is used, or if materials are to be welded for which the presetting on the basis of the silicon proportion does not yield any benefits.

According to a further aspect, a welding device is suggested which comprises a protective gas protection apparatus according to the aspect mentioned above. The welding device may be an automatic welding machine.

The welding device can comprise a recognition means for recognizing the type or the Si content of the welding wire, and an output means for delivering a signal representing the identifying feature. This allows an automatic adjustment of the protective gas mixture depending on the Si content of the welding electrode in view of a silicate-free weld seam.

According to a further aspect, a welding wire is suggested which has a codification for its Si content or its type.

According to all aspects of the invention interpolation lines can be determined as a section sequence, as a natural, continuous, monotone and non-negative spline, or as a continuous, monotone and non-negative, in particular quadratic Bezier curve.

According to the above mentioned aspects of the invention metal sheets can be welded which have a thickness of at most 5 mm.

According to all aspects of the invention the active gas preferably comprises oxygen or carbon dioxide or a mixture of these.

According to the above mentioned aspects of the invention the inert gas could comprise argon.

According to all aspects of the invention the method can further comprise a slag inspection step preferably consisting of:
  adjusting the proportion of the active gas to a value selected according to the regulation indicated in each case; and
  iteratively carrying out a test weld with the material to be welded, examining the weld seam with regard to slag deposits and, if applicable, varying the proportion of the active gas within the limits indicated in each case until the slag deposit is acceptable.

According to the above mentioned aspects of the invention the method can further comprise a quality testing step preferably consisting of:
adjusting the helium proportion to a value selected according to the regulation indicated in each case; and
iteratively examining other quality characteristics of the weld seam and, if applicable, varying the helium proportion within the indicated limits until the desired or maximum achievable quality is achieved.

In all aspects of the invention, an unproblematic welding of these wire types is made possible and at the same time the problem with superficial silicates is solved; this is achieved by a clever combination of the standard wire or an LSi wire with a protective gas whose active components are lowered to such an extent until no silicates are formed on the surface of the seam, and at the same time helium is mixed into it to improve the heat transmission and thus counteract the risk of pores and a poor flowability of the weld pool.

These wire/gas combinations are of interest to all industry sectors which want to save the bothersome removal of the silicates, in particular large-scale manufacturers such as the automotive industry and its supplying industry.

Further aspects, advantages and features of the present invention will be apparent from the following detailed description and the graphic illustration of preferred exemplary embodiments.

FIG. 1A is a diagram illustrating advantageous ranges of the proportion of the active gas of a protective gas depending on the Si content.

FIG. 1B is a diagram in which the advantageous ranges of FIG. 1A are approached and generalized by interpolation lines.

FIG. 1C is a diagram in which the advantageous ranges of FIG. 1A are approached and generalized by linear interpolation.

FIG. 2A is a diagram illustrating advantageous ranges of the helium proportion of the protective gas depending on the Si content.

FIG. 2B is a diagram in which the advantageous ranges of FIG. 1A are approached and generalized by linear interpolation.

FIG. 3 is a diagram illustrating the advantageous ranges of FIGS. 1A and 2A in a coordinate system defined by the proportion of the active gas of a protective gas and its helium proportion.

Figure 4:
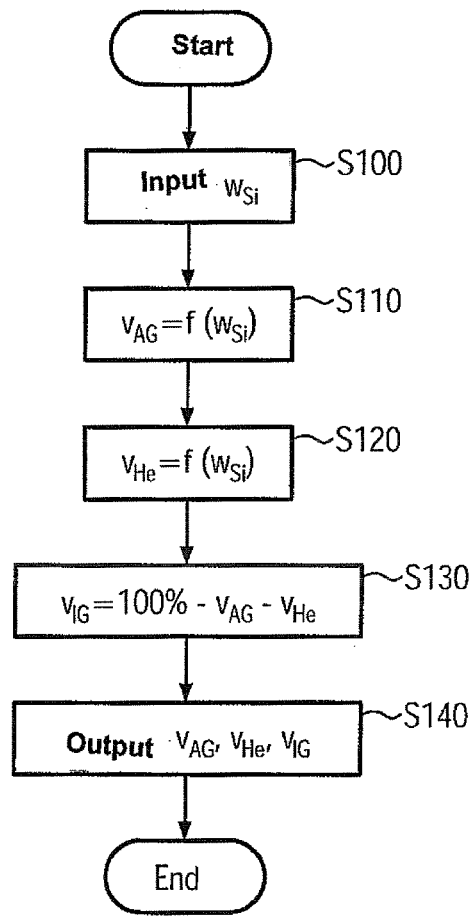
FIG. 4 is a flow diagram of a process of determining the protective gas mixture according to the invention.

The inventor of the present invention has carried out tests with different welding wires with the aim to produce almost slag-free weld seams during arc-welding with a consumable electrode. Here, the focus was laid on welds on thin metal sheets having a thickness of up to approximately 5 mm and made of unalloyed and low-alloy steel. Mixtures of argon with an active gas ($CO_2$ or $O_2$ or a mixture therefrom) and helium were used as the protective gas.

Particularly low-slag weld seams were formed with comparably low proportions of active gas in the protective gas. With a drastically lowered proportion of the active gas it was, however, required to increase the helium proportion in the protective gas in order to improve the heat input into the weld seam and the heat transmission. For reasons of cost, one tends to strive for keeping the helium consumption low. Basically, the following compositions have turned out to be advantageous for the welding protective gas:

Helium proportion: 10-70%, preferred 20-60%, in particular 30-50% Proportion of the active gas ($O_2/CO_2$): 0-10%, preferred 0.5-8%, in particular 1-5%

Three different wire types with differing content of silicon (Si) have basically been used. It has turned out surprisingly that the optimum range for the proportion of the active gas depends to a large extent on the wire type used. Depending on the wire type used, the aim to realize a silicate-free welding process is achieved with different gas mixtures, with the basic trend that the more active gas ($CO_2$ or $O_2$) may be present in the protective gas mixture, the less silicon is in the wire. The results can be illustrated in tabular form as follows:

| Wire type | Si content [%] | Active gas proportion [% Vol] | Optimum [% Vol] |
|---|---|---|---|
| A | 0.7-1.2 | 0.5-1.5 | 1.0 |
| B | 0.2-0.4 | 1.0-5.0 | 3.0 |
| C | 0.05-0.1 | 3.0-10.0 | 5.0 |

If a standard welding wire is used which contains between approx. 0.7 to 1,2% Si, the proportion of the active gas must be chosen so as to be very low (~0.5-1.5%) to be able to prevent the silicate formation. In case the arc is instable or the penetration is not sufficient due to the low proportion of the active gas, a welding wire with a lower Si content has to be used to facilitate a silicate-free welding with a higher proportion of the active gas (as explained above, the silicon is introduced into the weld seam almost exclusively by the wire). Using a welding wire with a lowered Si content (~0.2-0.4% Si), gas mixtures will be employed exhibiting a proportion of the active gas of approx. 1-5%. If a weld filler material with a particularly low Si content (~0.05-0.1% Si) is used, it will be welded under protective gas mixtures with a proportion of the active gas amounting to approx. 3-10%.

This interrelation is schematically shown in FIG. 1A. In this Figure, the proportion of the active gas v_AG [%] in the volume of the protective gas is plotted against the Si content w_Si [%] of the wire electrode. The ranges determined in each case for the different wire types are hatched and designated with the respective type characters A, B and C. The respective optimum points are referred to as P_A, P_B and P_C and connected with one another by an optimum line Opt_AG.

In a similar representation in FIG. 1B, the afore-mentioned ranges A, B and C are shown in hatched form with the aim to determine a generalized selection area for the proportion of the active gas v_AG. To this end, the respective upper right corner points P1, P2 and P3 of the ranges C, B and A are connected with one another and continued to find out an upper limit Max_AG for the selection area. In similar manner, the respective lower left corner points P4, P5 and P6 of the ranges C, B and A are connected with one another and continued to find out a lower limit Min_AG for the selection area. The selection area between the two curves Max_AG and Min_AG was hatched in the Figure. To give an orientation, the optimum line Opt_AG has been drawn in, too.

The lines Max_AG, Min_AG and Opt_AG in FIGS. 1A and 1B are formed by natural, continuous, monotone and non-negative splines which are defined by the respective data points. The data points are depicted in detail in the Table below:

|  | Line | | | | | | | | |
|---|---|---|---|---|---|---|---|---|---|
|  | Max_AG | | | Opt_AG | | | Min_AG | | |
|  | Data point | | | | | | | | |
|  | P1 | P2 | P3 | P_C | P_B | P_A | P4 | P5 | P6 |
| w_Si [%] | 0.1 | 0.4 | 1.2 | 0.075 | 0.3 | 0.85 | 0.05 | 0.2 | 0.7 |
| v_AG [%] | 10 | 5 | 1.5 | 5 | 3 | 1 | 3 | 1 | 0.5 |

Further data points such as suitable intercepts can be added, if necessary.

Instead of a spline interpolation, other sorts of interpolation can be used, e.g. a Bezier interpolation which, of course, also has to be continuous, monotone and non-negative. A quadratic Bezier curve is in consideration in the case of three data points.

FIG. 1C shows a linear interpolation as a particularly simple interpolation. Here, the upper limit Max_AG for the proportion of the active gas v_AG is formed by two rays starting from data point P2 and extending through the data points P1 and P3, respectively, the lower limit Min_AG for the proportion of the active gas v_AG is formed by two rays starting from data point P5 and extending through the data points P4 and P6, respectively, and the optimum line Opt_AG for the proportion of the active gas v_AG is formed by two rays starting from data point P_B and extending through the data points P_C and P_A, respectively. The selection area defined hereby is delimited in each case by the axes of coordinates as material proportions cannot assume a negative value.

Alternatively, the selection area can be limited by the largest and smallest silicon proportions w_Si and proportions of the active gas v_AG that occurred in the experiments. This is symbolized in FIG. 1C by the fact that ranges outside the respective extreme points P7 and P8 are only hatched in dot-like manner. This means that in this case the selection area for the proportion of the active gas v_AG is formed by a closed polygon defined by the points P1, P2, P3, P8, P6, P5, P4 and P7. The coordinates of the extreme points P7 and P8 are depicted in the Table below:

| Point | P7 | P8 |
|---|---|---|
| w_Si [%] | 0.05 | 1.2 |
| v_AG [%] | 10 | 0.5 |

In order to achieve a higher accuracy and a quicker convergence in the selection of the proportion of the active gas v_AG in the operational process, the selection area can also be narrowed. This is indicated in the Figure by lines Max_AG' and Min_AG' extending through data points which are shifted towards the respective optimum point P_C, P_B or P_A in a suitable manner. A further narrowed selection area is formed by the lines Max_AG" and Min_AG" at which the data points are situated at the level of the optimum points. In FIG. 1C, the data points of the lines Max_AG and Min_AG are represented by filled squares, the data points of the lines Max_AG' and Min_AG' by empty triangles and the data points of the lines Max_AG" and Min_AG" by empty circles. The data points of the line Opt_AG are represented by filled circles. Suitable data points for the lines Max_AG' and Min_AG' are depicted in the Table below:

|  | Line | | | | | |
|---|---|---|---|---|---|---|
|  | Max_AG' | | | Min_AG' | | |
|  | Data point | | | | | |
|  | P1' | P2' | P3' | P4' | P5' | P6' |
| w_Si [%] | 0.1 | 0.4 | 1.2 | 0.05 | 0.2 | 0.7 |
| v_AG [%] | 7.5 | 4 | 1.2 | 4 | 2 | 0.8 |

Suitable data points for the lines Max_AG" and Min_AG" are depicted in the Table below:

|  | Line | | | | | |
|---|---|---|---|---|---|---|
|  | Max_AG" | | | Min_AG" | | |
|  | Data point | | | | | |
|  | P1" | P2" | P3" | P4" | P5" | P6" |
| w_Si [%] | 0.1 | 0.4 | 1.2 | 0.05 | 0.2 | 0.7 |
| v_AG [%] | 5 | 3 | 1 | 5 | 3 | 1 |

It goes without saying that the above-named shifted data points can also be used for defining spline- or other interpolation curves. This is the first time that a general teaching is provided regarding the selection of the proportion of the active gas v_AG in the protective gas depending on the Si content in the welding electrode to obtain a seam surface which is as free from silicates as possible.

Since the heat conduction, the stability of the arc and the penetration also decrease with a falling proportion of the active gas, helium must be added to the protective gas mixture to compensate these effects. Depending on the selected proportion of the active gas, the helium proportion is between 10 and 70%, with the tendency that the more helium has to be admixed, the less active gas is present.

Preferred wire/protective gas combinations are, for instance

| Wire type | Si content [%] | Active gas proportion [% Vol] | Helium proportion [% Vol] |
|---|---|---|---|
| A (Standard) | 0.7-1.2 | 1 | 50 |
| B (Si medium) | 0.2-0.4 | 3 | 40 |
| C (Si low) | 0.05-0.1 | 5 | 30 |

The values indicated for helium and the active gas ($CO_2$) are to be understood as rough average values which are to be changed according to the actual Si proportion and the actual result of the welding, perhaps also in accordance with a possible Si proportion in the material itself.

FIG. 2A schematically illustrates the interrelation described above. In this Figure, the helium proportion v_He [%] in the volume of the protective gas is plotted against the Si content w_Si [%] of the wire electrode. The ranges determined in each case for the different wire types are hatched and designated with the respective type characters A, B and C therein. The respective optimum points are referred to as Q_A, Q_B and Q_C and connected with each other by an interpolated optimum line Opt_He.

In a similar representation in FIG. 2B, the aforementioned ranges A, B and C are shown in hatched form with the aim to determine a generalized selection area for the helium proportion v_He. This offers the opportunity to simplify the interpolation and only connect the respective upper left corner points Q1 and Q3 of the ranges C and A with each other with a straight line to determine an upper limit Max_He for the selection area. Similarly, the respective lower right corner points Q4 and Q6 of the ranges C and A are connected with each other with a straight line to determine a lower limit Min_He for the selection area. The selection area between the two curves Max_He and Min_He was hatched in the figure. To give an orientation, a linearized optimum line Opt_He is also drawn in, likewise considering only the optimum points Q1 and Q3 of the ranges C and A.

If a more accurate adaptation to the experimental values is desired, the respective corner points Q2 and Q4 of the range B are also taken into consideration in the interpolation as well as in the determination of the proportion of the active gas. A further improvement of the accuracy is achieved by a spline interpolation or Bezier curve or the like.

The associated data points for the determination of the helium proportion are depicted in the Table below:

| | Line | | | | | | | | |
|---|---|---|---|---|---|---|---|---|---|
| | Max_He | | | Opt_He | | | Min_He | | |
| | | | | Data point | | | | | |
| | Q1 | Q2 | Q3 | Q_C | Q_B | Q_A | Q4 | Q5 | Q6 |
| w_Si [%] | 0.05 | 0.2 | 0.7 | 0.075 | 0.3 | 0.85 | 0.1 | 0.4 | 1.2 |
| v_He [%] | 50 | 60 | 70 | 30 | 40 | 50 | 10 | 20 | 30 |

As a matter of principle, the selection area defined hereby is limited by the axes of coordinates as material proportions can not assume a negative value.

Alternatively, the selection area can be limited by the largest and smallest silicon proportions w_Si and helium proportions v_He which have occurred in the experiments. This is symbolized in the Figure in that ranges outside the respective extreme points Q7 and Q8 are only hatched in broken line. This means that in this case the selection area for the helium proportion v_He is formed by a closed polygon defined by the points Q1, Q2, Q3, Q8, Q6, Q5, Q4 and Q7. The coordinates of the extreme points Q7 and Q8 are depicted in the Table below:

| Point | Q7 | Q8 |
|---|---|---|
| w_Si [%] | 0.05 | 1.2 |
| v_He [%] | 50 | 30 |

Just like in the selection of the proportion of the active gas, the selection area for the helium proportion v_He can also be narrowed to also achieve a larger accuracy and quicker convergence in the operational process. This is indicated in FIG. 2B by lines Max_He' and Min_He' extending through data points which have been shifted towards the respective optimum point P_C, P_B or P_A in a suitable manner. A still further narrowed selection area is not reasonable in a linear interpolation with two data points because the optimum point Q_B would otherwise be outside the selection area as can be seen from FIG. 2B. With three data points, however, a further narrowing of the selection area by data points at the level of the optimum points would be taken into consideration. In the Figure, the data points of the lines Max_He and Min_He are represented by filled squares, the data points of the lines Max_He' and Min_He' by empty triangles and the data points of the limitation lines of a possible, further narrowed selection area by empty circles. The data points of the line Opt_He are illustrated with filled circles. Suitable data points for the lines Max_He' and Min_He' are depicted in the Table below:

| | Line | | | | | |
|---|---|---|---|---|---|---|
| | Max_He' | | | Min_He' | | |
| | Data point | | | | | |
| | Q1' | Q2' | Q3' | Q4' | Q5' | Q6' |
| w_Si [%] | 0.05 | 0.2 | 0.7 | 0.1 | 0.4 | 1.2 |
| v_He [%] | 40 | 50 | 60 | 20 | 30 | 40 |

Suitable data points for the still further narrowing limitation lines are depicted in the Table below:

| | Data point | | | | | |
|---|---|---|---|---|---|---|
| | Q1" | Q2" | Q3" | Q4" | Q5" | Q6" |
| w_Si [%] | 0.05 | 0.2 | 0.7 | 0.1 | 0.4 | 1.2 |
| v_He [%] | 30 | 40 | 50 | 30 | 40 | 50 |

This is the first time that a general teaching is provided regarding the selection of the helium proportion v_He in the protective gas depending on the Si content in the welding electrode to ensure a good heat input and heat transfer in economically feasible limits to obtain—with the proportion of the active gas being adapted—a seam surface as free from silicates as possible.

FIG. 3 shows the result of the preceding discussion in the form of a further diagram. Here, the helium proportion v_He is plotted against the proportion of the active gas v_AG and the experimentally established ranges for the three wire types A, B and C are drawn in. The optimum points of these ranges are drawn in as circles and referred to as R_A, R_B and R_C. These optimum points define a center line M which is basically obtained by interpolation in the way defined above, but in the present case results in a straight line. In the optimum points Q_A, Q_B and Q_C, the associated Si content w_Si in the wire electrode is known in each case. This allows a parameterization of the Si content w_Si on the center line M, giving a direct indication for both the proportion of the active gas v_AG and the helium proportion v_He when w_Si is known. On this basis, a fine matching of both proportions along the normal on the center line M is conceivable In order to avoid problems with faulty weld seams, it is preferred to select a welding wire having a high Si content, if possible, because silicon provides for a good flowability and wetting of the weld pool and promotes the degassing thereof.

Moreover products cannot be confused when standard welding wires are used, no additional stock and storage space for it is required and they are cheaper than the special goods having a lower Si content.

This is why the wire/gas combinations using a standard wire are preferred for this welding method:

Standard wire (~0.7-1.2% Si)+protective gas 30-50% He+0.5-1.5% $CO_2$+argon

On the basis of the preceding considerations, suitable protective gas mixtures can be made available for certain electrode types.

On the basis of the teaching indicated here, suitable protective gases can also be mixed on-site from individual components. The general procedure for mixing a suitable protective gas mixture is shown in FIG. 4 in the form of a flow diagram.

The Si content w_Si of the wire electrode is entered in step S100.

In step S110, the proportion of the active gas v_AG is determined as a function of the Si content w_Si; thereupon, the helium proportion v_He is determined as a function of the Si content w_Si in step S120. The two steps S110 and S120 can be combined into one step.

In step S130, the proportion v_IG of a further inert gas is determined as the remaining proportion.

Then, the determined proportions are outputted in step S140.

The sequence ends here; the determined proportions are adjusted in a mixing device or by reducing corresponding throttling means in the supply pipes of the individual gases.

It goes without saying that the evaluation of the proportion of the active gas v_AG and of the helium proportion v_He as a function of the Si content w_Si can be based on any consideration discussed above for the determining the respective selection areas. In particular, the evaluation of the proportions can be based on value tables made by means of the diagrams in FIGS. 1A to 3 and available in written form as tables or in a memory of a computer unit, or on calculation rules which have been defined on the basis of the interpolation routines described above and are present as diagrams or as a hardwired logic or as a program of a logic unit of a computing unit.

Figure 5:
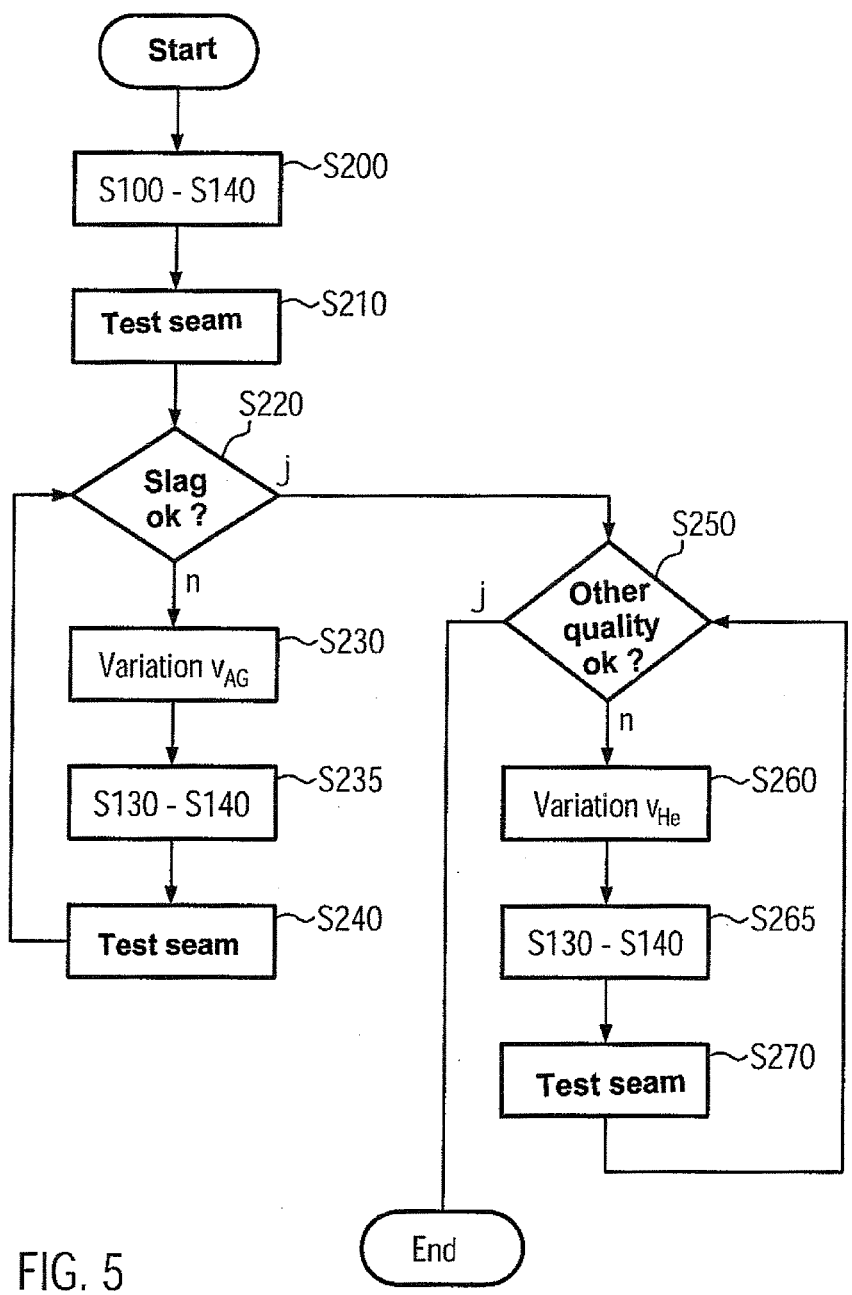
FIG. 5 is a flow diagram of a process of determining the protective gas mixture including an examination routine.

In FIG. 5, the process shown in FIG. 4 is enlarged by an examination routine. At first, the steps S100 to S140 described above are carried out in step S200. More precisely, the Si content w_Si of the wire electrode is entered, the proportions v_AG, v_He and v_IG of the active gas, helium and the further inert gas are determined as functions of the Si content w_Si or the remainder, and the determined proportions are outputted to produce a protective gas mixture.

In step S210, a test seam is produced with the selected protective gas composition; in step S220 it is verified whether the slag formation on the seam is acceptable. In case this verification is positive, the process goes to step S250. If the verification in step 5220 is negative, however, the process goes to step S230.

In step S230, the proportion of the active gas v_AG is varied; in step S235, the steps S130 and S140 described above are carried out. To be more precise, the proportion v_IG of the further inert gas is determined as the remainder of the changed proportion of the active gas v_AG and of the unchanged helium proportion v_He, and the new proportions are outputted to produce a protective gas mixture.

Subsequently, a new test seam is produced in step S240, and the process returns to the testing step S220.

As soon as the testing step S220 has shown a positive result, the process goes to step S250, as mentioned above.

In step S250 it is verified whether the weld seam meets other quality demands. This quality test can be limited to a pure visual inspection such as with respect to splashes. However, it may also include inspections regarding the strength, penetration and other parameters. If this inspection has a positive result, the process is finished as a suitable protective gas composition has been found. In case the inspection in step 5250 shows a negative result, the process goes to step S260.

In step S260, the helium proportion v_He is varied and, in step S265, the steps S130 and S140 described above are carried out. This means that the proportion v_IG of the further inert gas is determined as the remainder of the changed helium proportion v_He and of the unchanged proportion of the active gas v_AG, and the new proportions are outputted to produce a protective gas mixture.

A new test seam is then produced in step 5270, and the process returns to the testing step S250.

The process ends as soon as the testing step 5250 has shown a positive result, as already mentioned above.

Although not shown in more detail in FIG. 5, the helium proportion v_He can also undergo an adaptation to the varied proportion of the active gas v_AG in step S230, for example by means of a diagram like in FIG. 3 or a value table or a calculation rule established or defined on the basis thereof.

Excellent welding results could be achieved with all welding methods described above, in particular silicate-free weld seams during welding of unalloyed steels and low-alloy steels with a thickness of up to 5 mm.

Figure 6:
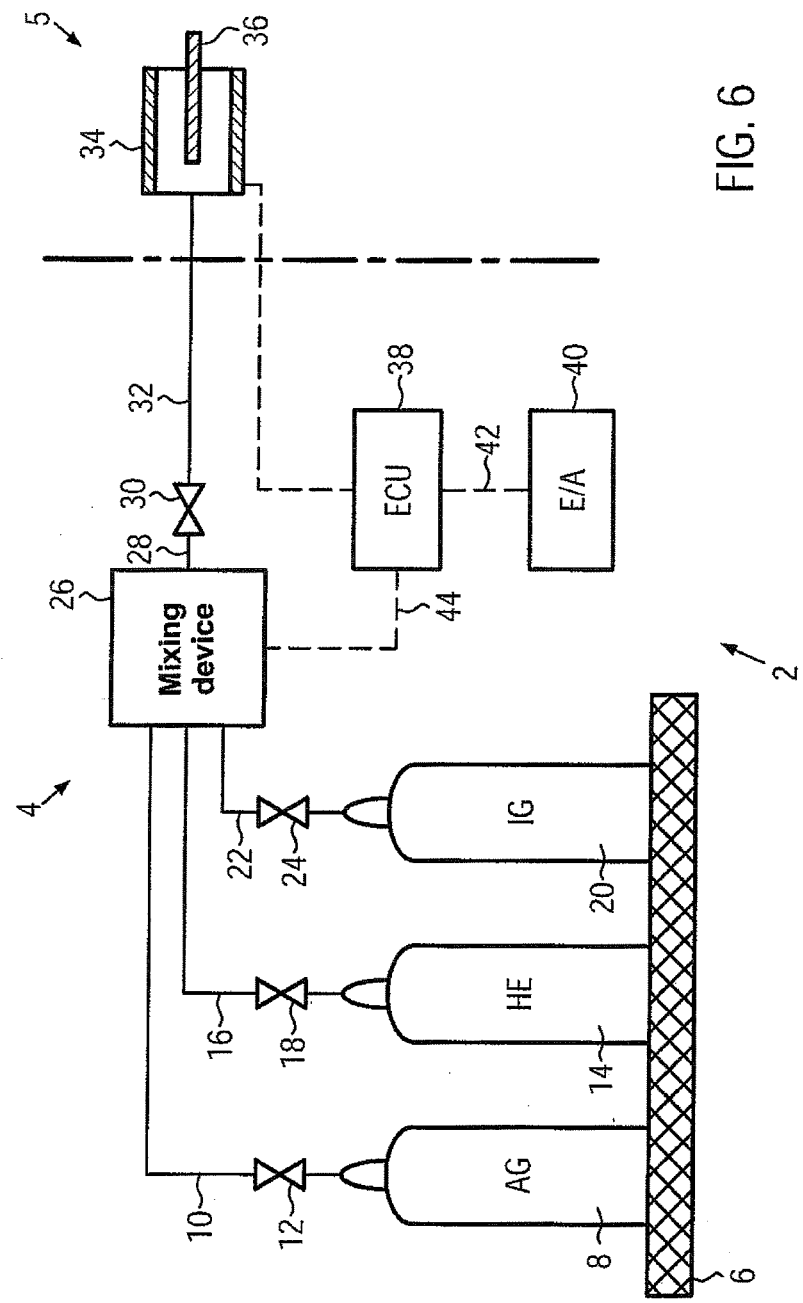
FIG. 6 is a schematic representation of a welding means comprising a protective gas production apparatus according to the invention.

FIG. 6 schematically shows a welding device 2 according to the invention.

The welding device 2 basically comprises a protective gas production apparatus 4 and an automatic welding machine 5. According to the Figure, any parts associated to the protective gas production apparatus 4 are shown at the left side of a dot-and-dash perpendicular line, whereas parts assigned to the automatic welding machine 5 are shown to the right of the dot-and-dash perpendicular line.

Located on a base plate 6 is a container 8 for active gas (AG) provided with a supply pipe 10 including a cut-off valve 12, a container 14 for helium (He) provided with a supply pipe 16 having a cut-off valve 18, and a container 20 for a further inert gas (IG) provided with a supply pipe 22 including a cut-off valve 24.

The supply pipes 10, 16, 22 open into a mixing device 26 serving for mixing a protective gas with specified proportions of the active gas, helium and inert gas. It is to be noted that the term "inert gas" always refers to the further inert gas and not to helium. Argon is primarily considered as the further inert gas. Neon, xenon and krypton could also be used in principle, although these gases will not be employed so often because of their high price. A protective gas connection pipe 28 with a primary cut-off valve 30 leads from the mixing device 26.

A protective gas pipe 32 leads from the primary cut-off valve to the welding means 5 of which only a welding head 34 comprising a wire electrode 36 is illustrated in the Figure.

Further, an electronic control device (ECU) 38 serving for controlling the protective gas production apparatus 4, and an input-/output device (E/A) 40 connected to the ECU 38 via a data line 42, pertain to protective gas production apparatus 4. Any data which is input into the E/A 40 is supplied to the ECU 38 through the data line 42, and data to be displayed on the E/A 40 or to be processed by it is fed to the E/A 40 via the data line 42 starting from the ECU 38.

The ECU 38 is further connected to the mixing device 26 via a data line 44. Via the data line 44, the ECU 38 feeds the mixing device 26 with target values for adjustment devices (not illustrated in further detail) serving for mixing the individual gases in mixing device 26. Moreover, measured values corresponding to actual values of the adjustment devices or to the actually achieved gas proportions are transmitted from the mixing device 26 to the ECU 38 via the data line 44.

The ECU 46 is further connected to the automatic welding machine 5 via a data line 46. The data line 46 serves the signal exchange between the ECU 46 and the automatic welding machine 5.

The ECU 46 can further be connected to the cut-off valves 12, 18, 24 and 30 through additional data lines (not illustrated in further detail) to monitor and/or control its state. These data lines can be combined with the data line 44.

It goes without saying that the holding containers 8, 14, 20 are only illustrated in the typical form of gas bottles by way of example. These containers can be of any form. The gases can also be stored in liquid or solid state and converted into the gaseous state, if necessary. Respective conditioning devices are not illustrated in more detail, but are known per se.

Figure 7:
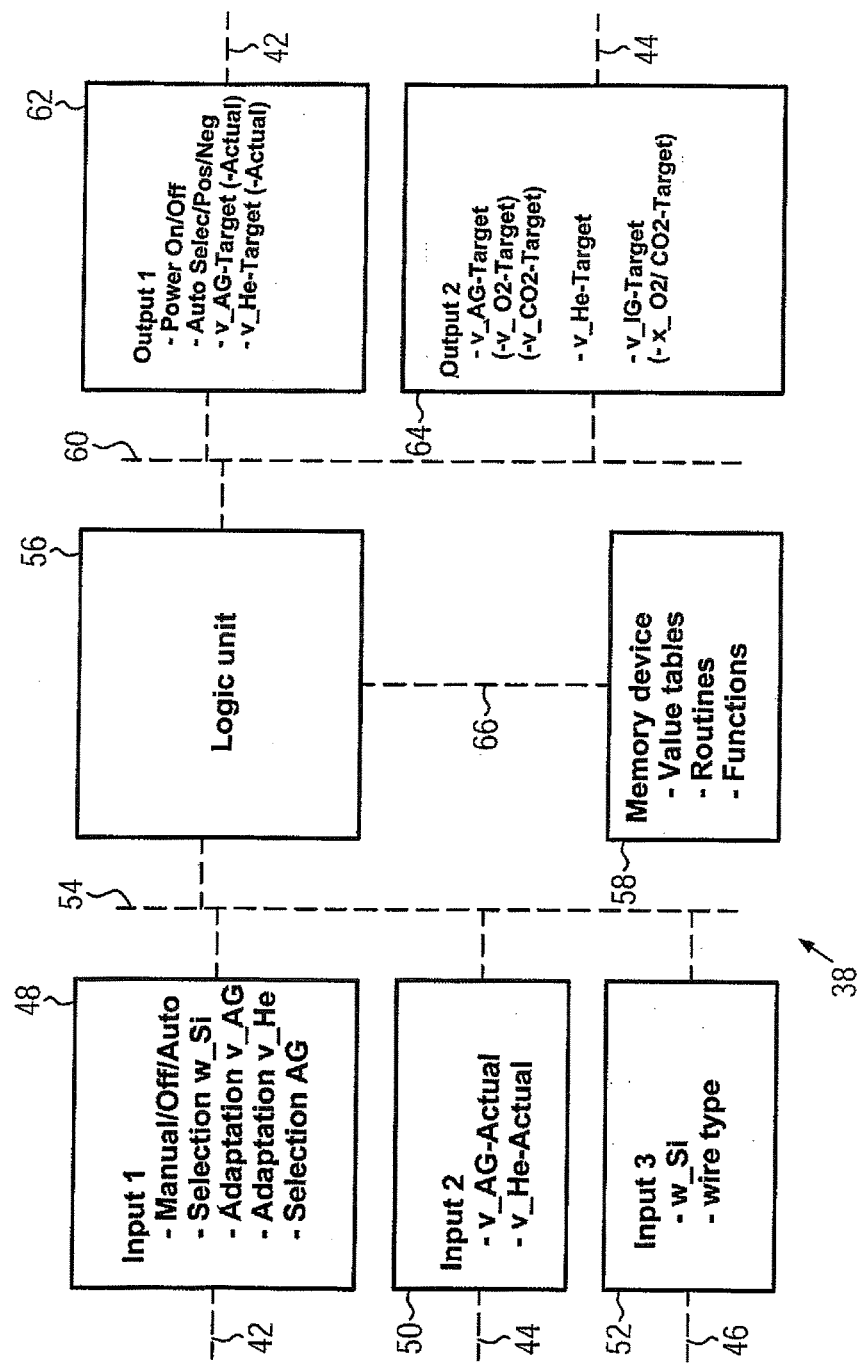
FIG. 7 is a block diagram of a control unit of the protective gas production apparatus according to the invention.

FIG. 7 shows the schematic structure of the ECU 38 by means of a block diagram.

The ECU 38 has a first input device 48 connected to the data line 42 to receive output signals of the E/A 40. The signals received here comprise:
- a signal "Manual/Off/Auto" indicating if an Si content of a welding electrode is entered manually, is to be determined automatically or is not to be taken into consideration;
- a signal "selection w_Si" corresponding to a manually selected Si content;
- a signal "Adaptation v_AG" indicating if, in which direction and by what amount a proportion of the active gas shall deviate from a theoretical value;
- a signal "Adaptation v_He" indicating if, in which direction and by what amount a helium proportion shall deviate from a theoretical value;
- a signal "selection AG" indicating which one of several active gases (such as $O_2$ and $CO_2$) is to be used, or in what mixing ratio.

The ECU 38 has a second input device 50 connected to the data line 44 to receive output signals of the mixing device 26. The signals received here comprise:
- a signal "v_AG-Actual" indicating an actually adjusted proportion of the active gas;
- a signal "v_He-Actual" indicating an actually adjusted helium proportion;
- if applicable, actual values of an opening amount of valves, of a state of cut-off valves and/or of an adjustment travel of other devices within the mixing device 26 (not illustrated in further detail);
- if applicable, monitoring data with respect to the gas containers such as temperature, pressure, etc. (not illustrated in further detail).

The ECU 38 comprises a third input device 52 connected to the data line 46 to receive output signals of the automatic welding machine 5. The signals received here comprise:
- a signal "w_Si" indicating an actually determined Si content of the welding electrode;
- a signal "wire type" indicating an actually determined wire type of the welding electrode;
- if applicable, operational data such as ON/OFF, feed rate, electrode change, etc. (not illustrated in further detail).

The input devices 48, 50, 52 are connected to a processing unit (logic unit) 56 via an input bus 54. Via an internal bus 66, this logic unit is connected to a memory device 58 holding data required by the logic unit 56, such as value tables, routines and functions. The memory device 58 can also hold an operating system for the operation of the ECU 38; this operating system can also be kept ready in a further memory chip. The processing unit 56, which can be a CPU of a type known per se, processes the inputted data and memory data to generate output data, in particular control data for the mixing device 26 as well as display data for the E/A 40.

Via an output bus 60, the processing unit 56 is connected to a first output device 62 coupled to the data bus 42 to transmit signals to the E/A 40. The signals which are output here comprise:
- a signal "Power On/Off" indicating a state of activation of the protective gas production apparatus;
- a signal "Auto Selec/Pos/Neg" indicating whether an automatic recognition of the Si content of the welding wire is selected, and if so, whether or not an automatic recognition is possible;
- a signal "v_AG-Target" indicating a determined target value for the proportion of the active gas;
- a signal "v_He-Actual" indicating a determined target value for the helium proportion;
- if applicable, the signal "v_AG-Actual" and the signal "v_He-Actual".

Via the output bus 60, the processing unit 56 is further connected to a second output device 64 coupled to the data bus 44 to transmit signals to the mixing device 26. The signals which are output here comprise:
- the signal "v_AG-Target";
- the signal "v_He-Target";
- a signal "v_IG-Target" indicating a determined target value for the proportion of the further inert gas;
- instead of the signal "v_AG-Target" a signal "v_$O_2$-Target", if need be, indicating a determined target value for the oxygen proportion in the protective gas, and a signal "v_$CO_2$-Target" indicating a determined target value for the carbon dioxide proportion in the protective gas;
- if applicable, a signal "x_$O_2$/$CO_2$-Target" indicating a determined target value for the ratio oxygen/carbon dioxide in the active gas.

Depending on the design of the mixing device it is possible that individual signals are not required if certain gas proportions automatically result due to structural conditions.

The ECU 38 can comprise further components serving the function thereof. Further input and output devices may be present for the exchange of data with the environment, drives for storage media, an own display means, etc. In this way, e.g. the value tables, routines and functions of the memory device 58 can be updated.

In particular, the logic unit 56 determines selected values for the proportion of the active gas, the helium proportion and the inert gas proportion in the protective gas as a function of the Si content in of the electrode on the basis of value tables, routines and functions in the memory device 56, which have been prepared on the basis of the previously discussed considerations with respect to selection areas and optimum values for the proportion of the active gas, the helium proportion and the inert gas proportion in the protective gas.

Further, the logic unit 56 increases or decreases the selected values as a function of the signals "Adaptation v_AG" and/or "Adaptation v_He".

The logic unit 56 further deactivates the mixing device 26 or feeds it with preselected standard values and sets the signal "Power On/Off" to OFF when the signal "Manual/Off/Auto"

is OFF, and sets the signal "Power On/Off" to ON if the signal "Manual/Off/Auto" indicates Manual or Auto.

The logic unit 56 further uses the signal "selection w_Si" for the calculations if the signal "Manual/Off/Auto" indicates a manual input.

The logic unit 56 further sets the signal "Auto Selec/Pos/Neg" to Selec if the signal "Manual/Off/Auto" indicates an automatic recognition.

The logic unit 56 further uses the signal "w_Si" for the calculations or determines the silicon proportion by means of the signal "wire type" if the signal "Manual/Off/Auto" indicates an automatic recognition and if the signal "w_Si" or the signal "wire type" indicates that an automatic recognition is possible, and in this case sets the signal "Auto Selec/Pos/Neg" to Pos.

Further, the logic unit 56 sets the signal "Auto Selec/Pos/Neg" to Neg if the signal "Manual/Off/Auto" indicates an automatic recognition and the signals "w_Si" and "wire type" indicate that an automatic recognition is not possible.

By means of the logic unit 56, the values determined for the gas proportions in the protective gas are converted into signals which enable a driving of the mixing device.

Further, the logic unit 56 can use the actual value signals returned by the mixing device 26 to carry out a regulation process.

It is also possible to use state signals of the automatic welding machine 5 or monitoring signals in order to close or open the primary cut-off valve 30 and/or the individual cut-off valves 12, 18, 24, hence to contribute to the plant safety and to minimize the gas consumption.

Figure 8:
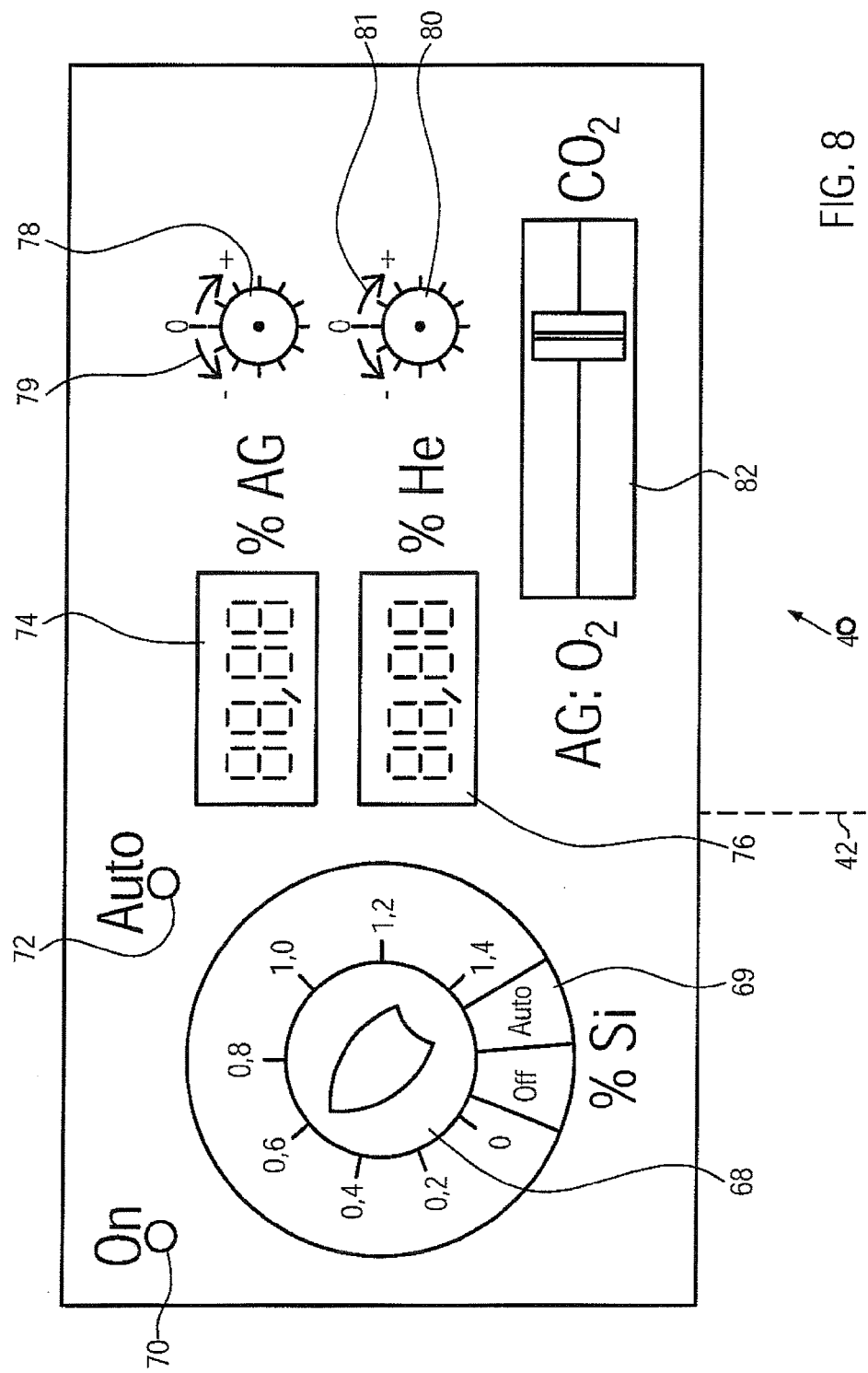
FIG. 8 is a representation of a display- and input unit of the protective gas production apparatus according to the invention.

FIG. 8 shows a control panel of the E/A 40 in top view with associated operating and display elements.

The E/A 40 receives input signals from the ECU 38 and sends output signals to the ECU 38 via the data line 42.

A rotary knob 68 is connected to a switching network and a potentiometer or the like, which comprises at least two fixed switching positions and an infinitely variable or stepped switching range and generating the signal "Manual/Off/Auto" and the signal "selection w_Si". In a first fixed switching position, the signal "Manual/Off/Auto" adopts the value OFF. In a second fixed switching position, the signal "Manual/Off/Auto" adopts the value Auto. In the switching range, the signal "Manual/Off/Auto" adopts the value Manual and the signal "selection w_Si" corresponds to the position within the switching range. The switching positions and the switching range are indicated on a scale 69.

A light-emitting diode 70 indicates the functional status of the device. It preferably emits green light if the signal "Power On/Off" is ON. This is delivered by the ECU 38 if the signal "Manual/Off/Auto" is not OFF.

A light-emitting diode 72 indicates the status of an automatic electrode recognition and is capable of emitting light in three colors. It preferably emits yellow light if the signal "Auto Selec/Pos/Neg" represents Selec. It preferably emits green light if the signal "Auto Selec/Pos/Neg" represents Pos. It preferably emits red light if the signal "Auto Selec/Pos/Neg" represents Neg.

It is to be noted that the signal "Auto Selec/Pos/Neg" can be reduced to a signal "Auto Pos/Neg". In this case, the ECU 38 initially sets the signal "Auto Pos/Neg" to Neg if the signal "Manual/Off/Auto" represents Auto, and only sets it to Pos if the signal "w_Si" or the signal "wire type" indicates that an automatic recognition of the Si content is possible. In this case the light-emitting diode 72 only has to have two colors.

A digital display 74 serves for displaying the proportion of the active gas, whereas a digital display 76 serves for displaying the helium proportion. It is provided here that the respective set-point values are displayed, but alternatively or additionally the actual value can also be indicated on separate digital displays (not illustrated in further detail). A selection switch (not illustrated in further detail) for selecting actual value or set-point value may be provided, too. Hence, the digital displays 74 and 76 convert the signals "v_AG-Target" and "v_He-Target" and/or the signals "v_AG-Actual" and "v_He-Actual". Instead of the digital displays, pointer displays can also be provided.

Two knurled rotary buttons 78 and 80 serve the fine-tuning of the active gas and helium proportions. Hence, the associated infinitely variable switching networks, potentiometers or the like generate the signals "Adaptation v_AG" and "Adaptation v_He". The rotary buttons 78, 80 also have markings allowing a precise positioning with the aid of scales 79, 81. The scales 79, 81 are not provided with absolute values, but merely with a zero position as well as plus and minus ranges. In case the rotary buttons 78, 80 allow a rotation of more than 180°, reset devices (not illustrated in further detail) can be provided which are able to return the associated instrument to the zero position.

A slide control 82 allows to preset the proportion of two active gases (here: $O_2$ and $CO_2$) with respect to one another. The slide control generates the signal "selection AG". Instead of the slide control 82, a change-over switch (not illustrated in further detail) may also be provided, which allows the mere switching between two active gases.

Figure 9:
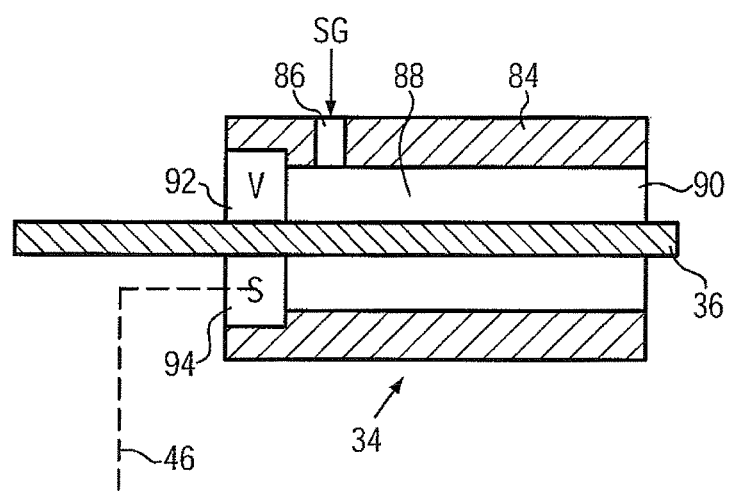
FIG. 9 is a representation of a head of an automatic welding machine according to the invention.

FIG. 9 shows the welding head 34 of the machine 5 in further details.

The welding head 34 comprises a housing 84 with a protective gas connector (SG) 86. The protective gas connector 86 opens into a duct 88 leading to an exit opening of the housing 84.

The electrode 36 is guided inside the housing. The electrode 36 is advanced by a feeding device 92 installed in the housing 84.

Further, a sensor unit 94 is provided which directly detects the type of the electrode 36 used or its Si content w_Si.

Welding electrodes for automatic welding machines are used nowadays in the form of wires on large coils. At the free end of the welding wire, a codification can be provided, for instance, making it possible for the sensor unit 94 to recognize the type or the Si content of the wire. It is also possible that such codification is applied to the wire at regular intervals or in continuous form. The codifications can be realized in the form of the diameter, the cross-sectional shape, longitudinal grooves, embossments or etched portions, or they are simple labels made of paper or plastic which are removed in the sensor or burn during use of the wire anyway.

| Reference numerals: | |
|---|---|
| A | type designation of a normal electrode |
| B | type designation of an electrode with reduced Si content |
| C | type designation of an electrode with low Si content |
| | A, B, C are also used for experimentally established value ranges associated to the respective types of electrodes. |
| M | center line |
| Max_AG | interpolation line of the upper limit for active gas |
| Opt_AG | middle interpolation line of the ranges for active gas |
| Min_AG | interpolation line of the lower limit for active gas |
| Max_He | interpolation line of the upper limit for helium |
| Opt_He | middle interpolation line of the ranges for helium |
| Min_He | interpolation line of the lower limit for helium |
| P_A, B, C | points of optimum for ranges A, B, C with respect to active gas data points for interpolation line Opt_AG |
| P_1, 2, 3 | data points for interpolation line Max_AG |

-continued

| Reference numerals: | |
|---|---|
| P_4, 5, 6 | data points for interpolation line Min_AG |
| P_7, 8 | corner points of a selection area for active gas |
| Q_A, B, C | points of optimum for ranges A, B, C with respect to helium data points for interpolation line Opt_He |
| Q_1, 2, 3 | data points for interpolation line Max_He |
| Q_4, 5, 6 | data points for interpolation line Min_He |
| Q_7, 8 | corner points of a selection area for helium |
| R_A, B, C | points of optimum for ranges A, B, C with respect to active gas and helium data points for center line M |
| v_AG | proportion of the active gas of the protective gas in % of the total volume |
| v_CO₂ | proportion of carbon dioxide of the protective gas in % of the total volume |
| v_He | proportion of helium of the protective gas in % of the total volume |
| v_O₂ | proportion of oxygen of the protective gas in % in the total volume |
| w_Si | Si content of the electrode in % |
| 2 | welding device |
| 4 | protective gas production apparatus |
| 5 | automatic welding machine |
| 6 | base plate |
| 8 | storage container for active gas |
| 10 | supply pipe for active gas |
| 12 | cut-off valve for active gas |
| 14 | storage container for helium |
| 16 | supply pipe for helium |
| 18 | cut-off valve for helium |
| 20 | storage container for inert gas |
| 22 | supply pipe for inert gas |
| 24 | cut-off valve for inert gas |
| 26 | mixing device |
| 28 | protective gas discharge pipe |
| 30 | primary cut-off valve |
| 32 | connection line |
| 34 | welding head |
| 36 | welding wire |
| 38 | control device |
| 40 | input-output device |
| 42, 44, 46 | signal lines |
| 48 | first receiving device |
| 50 | second receiving device |
| 52 | third receiving device |
| 54 | input bus |
| 56 | logic unit |
| 58 | memory device |
| 60 | output bus |
| 62 | first output device |
| 64 | second output device |
| 66 | internal bus |
| 68 | Si selection switch |
| 69 | Si selection scale |
| 70 | power ON display |
| 72 | auto-recognition display (three-colored) |
| 74 | AG display |
| 76 | He display |
| 78 | AG adaptation switch |
| 79 | AG adaptation scale |
| 80 | He adaptation switch |
| 79 | He adaptation scale |
| 82 | AG selection and mixture slide control |
| 84 | housing |
| 86 | protective gas connector |
| 88 | protective gas duct |
| 90 | outlet |
| 92 | feeding device |
| 92 | sensor unit |

The invention claimed is:

1. A method for arc welding with a consumable electrode under a protective gas, wherein the protective gas is a mixture comprising at least helium and an active gas as well as a further inert gas, wherein a proportion of the active gas in the protective gas is determined and adjusted depending on a silicon content of a welding wire, wherein an upper limit of the proportion of the active gas is defined by an upper interpolation line (Max_AG) and the lower limit of the proportion of the active gas is defined by a lower interpolation line (Min_AG), each comprising at least the data points (P1-P3, P4-P6) indicated in the Table below:

| | Max_AG | | | Min_AG | | |
|---|---|---|---|---|---|---|
| | P1 | P2 | P3 | P4 | P5 | P6 |
| w_Si [%] | 0.1 | 0.4 | 1.2 | 0.05 | 0.2 | 0.7 |
| v_AG [%] | 10 | 5 | 1.5 | 3 | 1 | 0.5, | with w_Si being the proportion of the silicon in relation to the a total mass of the material of the welding wire in mass % and v_AG being the proportion of the active gas in the total volume of the protective gas in volume %.

2. The method according to claim 1, wherein an upper limit of the proportion of the active gas is defined by an upper interpolation line and a lower limit of the proportion of the active gas is defined by a lower interpolation line, comprising at least the data points (P1'-P3', P4'-P6') indicated in the Table below:

| | Max_AG' | | | Min_AG' | | |
|---|---|---|---|---|---|---|
| | P1' | P2' | P3' | P4' | P5' | P6' |
| w_Si [%] | 0.1 | 0.4 | 1.2 | 0.05 | 0.2 | 0.7 |
| v_AG [%] | 7.5 | 4 | 1.2 | 4 | 2 | 0.8, | with w_Si being the proportion of the silicon in relation to a total mass of the material of the welding wire in mass % and v_AG being the proportion of the active gas in the total volume of the protective gas in volume %.

3. The method according to claim 1, wherein an upper limit of the proportion of the active gas is defined by an upper interpolation line and a lower limit of the proportion of the active gas is defined by a lower interpolation line, each comprising at least data points (P1"-P3", P4"-P6") indicated in the Table below:

| | Max_AG" | | | Min_AG" | | |
|---|---|---|---|---|---|---|
| | P1" | P2" | P3" | P4" | P5" | P6" |
| w_Si [%] | 0.1 | 0.4 | 1.2 | 0.05 | 0.2 | 0.7 |
| v_AG [%] | 5 | 3 | 1 | 5 | 3 | 1, | with w_Si being the proportion of the silicon in relation to a total mass of the material of the welding wire in mass % and v_AG being the proportion of the active gas in the total volume of the protective gas in volume %.

4. The method according to claim 1, wherein a proportion of the active gas is limited in an upward direction by a largest data value of the upper interpolation line and in a downward direction by the smallest data value of a lower interpolation line.

5. The method according to claim 1, wherein the proportion of the active gas is determined by an interpolation line comprising at least data points (P_C, P_B, P_A) indicated in the Table below:

|  | OPT_AG | | |
|---|---|---|---|
|  | P_C | P_B | P_A |
| w_Si [%] | 0.075 | 0.3 | 0.95 |
| v_AG [%] | 5 | 3 | 1, | with w_Si being the proportion of silicon in relation to a total mass of the material of the welding wire in mass % and v_AG being the proportion of the active gas in the total volume of the protective gas in volume %.

6. The method according to claim 1, wherein a proportion of helium in the total volume of the protective gas ranges from about 10% to about 70%.

7. The method according to claim 1, wherein the proportion of helium in the protective gas is determined depending on the silicon content of the welding wire.

8. The method according to claim 7, wherein an upper limit of the helium proportion is limited by a straight line in accordance with the equation $$v\_He = a \times w\_Si + b$$

with a=30.77 and b=48.46 volume %, and the lower limit of the helium proportion being limited by a straight line in accordance to the equation $$v\_He = c \times w\_Si + d$$

with c=18.18 and d=8.18 volume %,
where v_He is a helium proportion in volume % and w_Si is an Si content of the wire electrode in mass %.

9. The method according to claim 7, wherein the helium proportion is determined by an interpolation line comprising at least the data points indicated in the Table below:

|  | OPT_He | | |
|---|---|---|---|
|  | Q_C | Q_B | P_A |
| w_Si [%] | 0.075 | 0.3 | 0.95 |
| v_He [%] | 30 | 40 | 50. | where w_Si is the proportion of the silicon in relation to the a total mass of the material of the welding wire in mass % and where v_He is an unchanged helium proportion in volume %.

10. The method according to claim 7, wherein the helium proportion is determined by a straight line in accordance to the equation $$v\_He = e \times w\_Si + f$$

with e=22.86 and f=28.29 mass %,
where v_He is an unchanged helium proportion and w_Si is an Si content of the wire electrode in mass percent.

11. The method according to claim 1, further comprising the steps:
  manually entering the silicon content of the welding wire used; and
  automatically adjusting the content of the active gas and/or the helium proportion of the active gas depending on the silicon content of the welding wire.

12. The method according to claim 1, further comprising the steps:
  automatically recognizing the silicon content of the welding wire used; and
  automatically adjusting the content of the active gas and/or the helium proportion of the active gas depending on the silicon content of the welding wire.

* * * * *